United States Patent [19]

Daniel et al.

[11] 4,364,272
[45] Dec. 21, 1982

[54] MULTI-POSITION ADJUSTABLE TEST FIXTURE

[75] Inventors: James A. Daniel; George T. Pinson, both of Huntsville, Ala.

[73] Assignee: The Boeing Company, Seattle, Wash.

[21] Appl. No.: 192,685

[22] Filed: Oct. 1, 1980

[51] Int. Cl.³ .......................................... G01M 19/00
[52] U.S. Cl. ................................. 73/432 R; 248/181
[58] Field of Search ................... 73/432 R, 147, 1 E; 248/179, 181

[56] References Cited

U.S. PATENT DOCUMENTS

| | | | |
|---|---|---|---|
| 3,189,775 | 6/1965 | Flyer | 248/181 |
| 3,276,251 | 10/1966 | Reed | 73/147 |
| 3,866,467 | 2/1975 | Horanoff | 73/147 |
| 4,158,845 | 6/1979 | Pinson | 74/86 |

Primary Examiner—S. Clement Swisher
Attorney, Agent, or Firm—Thomas H. Murray

[57] ABSTRACT

A text fixture supports a test article in selected positions relative to a fixed point within the test article. A stylus extends from the test article through slots in two spaced-apart positioning plates. The alignment of the slots establishes the position of the stylus and the corresponding test article position. Means for controlling the positioning plates are provided.

8 Claims, 3 Drawing Figures

MULTI-POSITION ADJUSTABLE TEST FIXTURE

BACKGROUND OF THE INVENTION

1. Field of the Invention:

This invention relates to a test fixture for supporting a test article in selected positions relative to a fixed point within the test article.

2. Description of the Prior Art:

Test fixtures for positioning test articles in space have employed complicated and expensive gimbal mounting devices having multiple concentric yokes, one or more of which may be driven by means of expensive and sensitive servomotors. Such support fixtures are employed for testing space missiles, aircraft, sensors and other test articles and their response to various stimuli. All of the prior art devices are either inadequate because they do not provide a sufficient range of selectable positions or they are extremely expensive and limited in range and purpose.

There exists a need for a test fixture which will permit a test article to be mounted in a variety of selected positions in space about a fixed point within the article.

The development of a non-gimbaled pointer and tracking platform assembly (U.S. Pat. No. 4,158,845) has permitted the development of the present test fixture which, in its preferred embodiment, employs a non-gimbaled support element of the type described in the aforesaid U.S. Pat. No. 4,158,845.

SUMMARY OF THE INVENTION

According to the present invention, a relatively inexpensive yet effective test fixture for supporting a test article in space can be achieved. A two-part mounting structure includes a mounting saddle securing the test article and a support frame for the mounting saddle. The mounting saddle is secured to the support frame in such fashion that the test article which is mounted on the saddle will be movable about a fixed point within the test article which remains fixed with respect to the frame.

Two positioning plates are mounted for rotational movement, each about a common rotational axis which extends through the fixed point of the test article. Each of the positioning plates has a cam slot of suitable geometry. A driving stylus is secured to the test article and extends through the cam slots of the two positioning plates in such fashion that the instantaneous position of the two positioning plates will establish the location of the drive stylus and hence the corresponding instantaneous position of the test article. The drive stylus is aligned to function as a radial member extending through the said fixed point of the test article.

In a preferred embodiment, the positioning plates are dish-shaped and are secured to a frame at their periphery, although other placement of the positioning plates is contemplated. In a further preferred embodiment, a separate drive means is provided for each of the positioning plates in engagement with the periphery of the plate. The drive means for each plate can be regulated by a suitable electronic driver which itself may be acted upon by a computer control system. In a further refinement of the invention, the instantaneous position of the test article can be measured by appropriate sensors and the sensors may generate feedback signals for altering the position of the test article.

DESCRIPTION OF THE PREFERRED EMBODIMENTS

Figure 1:
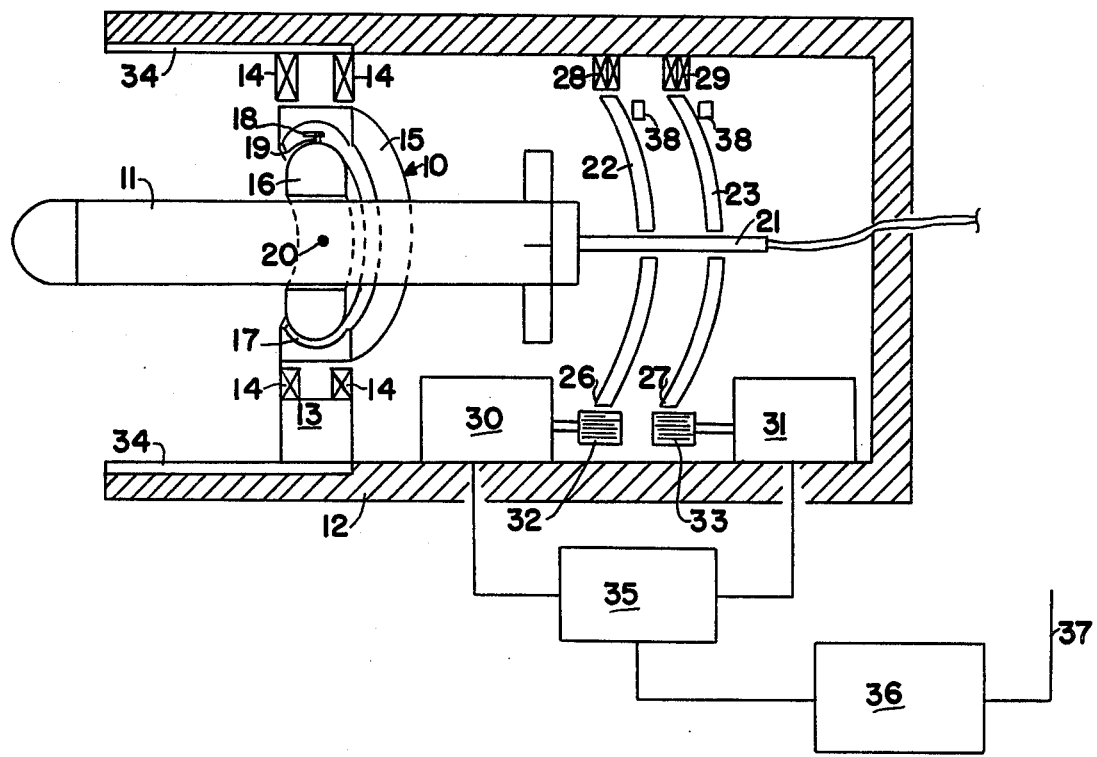
FIG. 1 is a schematic illustration, in side elevation, of a typical test fixture according to this invention.

A test article 11 might be a space missile which must be moved through a range of motions which are similar to or identical to the motions which such missile would experience if it were in free motion. The test article may be an entire missile or a particularly critical component of a missile, for example, a missile nose section. The test fixture includes a frame 12 which is shown as a single frame, although it will be understood that multiple framing elements, secured to a common base can be employed.

Positioned within the frame 12 is a main support 13 which includes bearings 14 which support a test article saddle 10 which has an outer ring 15 with a spherical inner surface 17 and an inner ring 16 to which the test article 11 is secured. The inner ring 16 has a spherical outer surface corresponding to the surface 17. A pin slot 18 is provided throughout the spherical surface 17 for receiving one or more pins 19 which restrict rotation of the inner ring 16 within the spherical surface 17 and yet permit angular movement of the inner ring 16 within the spherical surface 17. The test article 11 has a fixed point 20 which coincides with the geometric center of the inner ring 16. Thus, movement of the test article 11 will not result in any movement of a fixed point 20 which coincides with the geometric center of the inner ring 16.

A drive stylus 21 is secured to the test article 11 along a longitudinal axis which extends through the fixed point 20.

Figure 2:
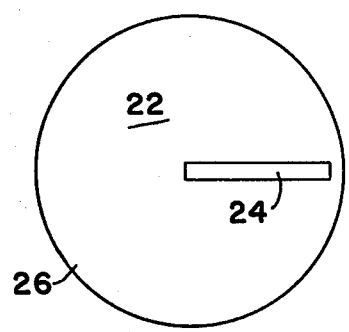
FIGS. 2 and 3 are plan views of two typical positioning plates useful in the present invention.
Figure 3:
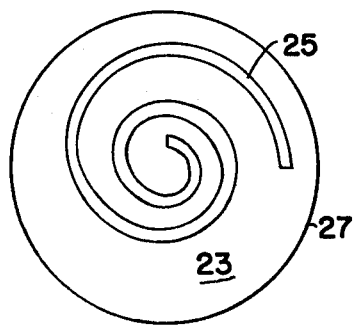

Two positioning plates 22, 23 are mounted, each rotatable about a common rotational axis which extends through fixed point 20 and coincides with the drive stylus 21. Preferably, the positioning plates 22, 23 are dish-shaped and, as shown in FIGS. 2 and 3, each is equipped with a cam slot 24, 25. Each of the positioning plates 22, 23 has a periphery 26, 27, preferably having uniformly-spaced drive teeth whereby each of the positioning plates 22, 23 corresponds to a large gear. The drive gearing can be placed at any convenient location to satisfy the requirements of the installation. The positioning plates 22, 23 are secured rotatably by means of appropriate bearings 28, 29 which may extend around the entire periphery or which may be placed at selected regions of the periphery to provide adequate support for the rotatable mounting.

Each positioning plate preferably has a drive motor 30, 31 connected to an appropriate gear 32, 33 which is in engagement with the periphery 26, 27 of the positioning plates 22, 23, respectively.

Thus, it will appear that the drive stylus 21 is positively positioned according to the instantaneous angular relation of the cam slot 24 of the forward positioning plate 22 and the cam slot 25 of the rear positioning plate 23. If the rear positioning plate 23 remains stationary and the forward positioning plate 22 turns, the drive stylus 21 will track through the path of the spiral drive 25 and the test article 11 would adopt a corresponding motion about the fixed point 20. If the forward positioning plate 22 remains stationary and the rear positioning plate 23 rotates, the drive stylus 21 will move in a plane established by the axis of the cam slot 24 in accordance with the instantaneous position of the rear positioning plate 23.

It should be apparent that by appropriate positioning of the two positioning plates 22, 23, the drive stylus 21 and, hence, the test article 11 can be presented in a variety of selected dispositions about the fixed point 20.

The drive stylus 21 preferably is a hollow tube which permits the delivery of control cables, electrical, pneumatic, hydraulic, etc. from the test article 11 through the walls of the frame 12 for observation, recording, comparison, feedback, etc.

It will be observed that the frame 12 is equipped with lengthwise rails 34 upon which the bearings 14 are mounted. The rails permit the bearings 14 to slide relative to the fixed position of the positioning plates 22, 23; thereby the fixture can accommodate different test articles 11 or accommodate tests of the same test article 11 about different fixed points other than fixed point 20 which is presented when the bearings are in the position shown in FIG. 1.

The drive motors 30, 31 can be servomotors whose instantaneous position is determined by appropriate drive motor electronic driving apparatus 35. The electronic driver 35 may, in turn, be controlled by a computer control system 36 which operates in accordance with preprogrammed requirements or which may operate upon feedback information obtained from the test article and delivered to the computer control system 36 through a conductor 37.

Sensing devices 38 may be positioned within the frame 12 in order to observe the instantaneous position of each of the two positioning plates 22, 23.

We claim as our invention:

1. A test fixture for selectively positioning a test article in space comprising:
   a support for said article which permits limited angular movement of said article about a selected fixed point within said article, said support comprising a rotatable outer ring and a cooperating inner ring through which said article extends, the inner and outer rings having cooperating spherical surfaces which permit universal movement of the article about said fixed point;
   a pair of spaced-apart positioning plates each rotatably mounted about a common axis;
   at least one cam slot through each of said positioning plates;
   positioning means for establishing instantaneous axial position of either of said positioning plates; and
   a drive stylus secured to said test article and extending through the cam slot of each of said positioning plates, whereby the disposition of said stylus and said article is established by the relative angular relation of the two positioning plates.

2. The test fixture of claim 1 wherein said fixed point of said test article coincides with the central axis of said mounting means and also coincides with the common rotational axis of the said positioning plates.

3. The test fixture of claim 1 wherein the said positioning plates are dish-shaped surfaces which at their periphery are rotatably secured to a frame.

4. The test fixture of claim 3 including drive means engaging the periphery of at least one of said positioning plate to establish the instantaneous location thereof.

5. The test fixture of claim 1 including separate drive means for each positioning plate for establishing the instantaneous position of each positioning plate.

6. The test fixture of claim 1 wherein the said support and the said positioning plates are secured to frames having a common base.

7. The test fixture of claim 6 wherein rails are provided to permit the said support to be moved relative to the said common base.

8. The test fixture of claim 1 wherein control cables extend from said test article through said stylus and to a control device.

* * * * *